United States Patent Office.

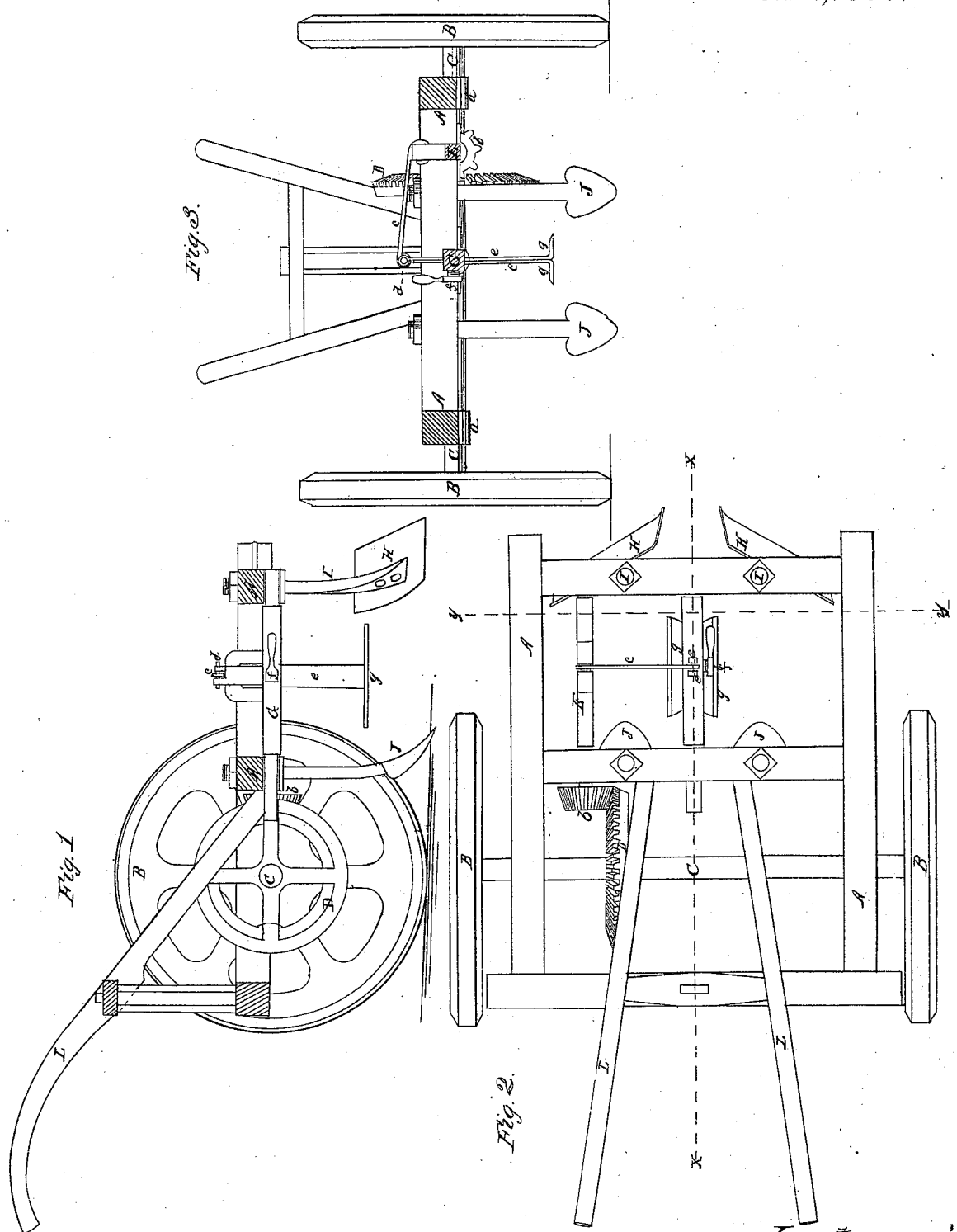

E. H. GOELET AND E. B. GOELET, OF GOLDSBOROUGH, NORTH CAROLINA.

Letters Patent No. 72,479, dated December 24, 1867.

IMPROVEMENT IN COTTON-CULTIVATOR.

*The Schedule referred to in these Letters Patent and making part of the same.*

TO ALL WHOM IT MAY CONCERN:

Be it known that we, E. H. GOELET and E. B. GOELET, of Goldsborough, in the county of Wayne, and State of North Carolina, have invented a new and improved Cotton-Cultivator; and we do hereby declare that the following is a full, clear, and exact description thereof, reference being had to the accompanying drawings, making a part of this specification, in which—

Figure 1 is a longitudinal section taken in a vertical plane through the improved cultivator.

Figure 2 is a top view of the machine.

Figure 3 is a transverse section, taken through the machine in the vertical plane indicated by red line $y\ y$ in fig. 2.

Similar letters of reference indicate corresponding parts in the three figures.

This invention relates to certain improvements on cotton-cultivators which are to be used after the cotton comes up, and before the plants begin to branch, and which are designed for scraping, chopping, and siding or earthing up the plants.

The nature of this invention consists in applying to a two-wheel carriage which is provided with handles, and adapted for being drawn by two horses, two scraping-blades or shares, a vibrating chopper, which will cut, in swinging, both ways, and two ploughs or shovels, which will throw the earth loosely about the roots of the plants after the earth has been scraped, and the plants thinned out, as will be hereinafter described.

To enable others skilled in the art to understand our invention, we will describe its construction and operation.

In the accompanying drawings, A represents a rectangular frame, which is mounted upon two transporting-wheels, B B, which also serve as drivers for giving motion to a vibratory chopper. These two wheels are keyed fast upon an axle, C, which extends transversely across said frame A, and turns in boxes, $a\ a$, which are bolted to the under side of this frame. Upon the axle C, on one side of the middle of the length thereof, a large bevel-spur wheel, D, is keyed, which engages with a bevel-pinion, $b$, which is keyed on the rear end of a longitudinal crank-shaft, E. To the crank of this latter shaft one end of a pitman-rod, $c$, is attached, the opposite end of which is attached to a pintle, $d$, upon the upper ends of two straight cutter-shanks, $e\ e$. These two shanks or flat bars, $e\ e$, are connected together at their upper ends by means of said pintle $d$ passing through eyes formed on them; and both shanks pass through a slot which is made through a longitudinal rock-shaft, G, and are secured firmly to this shaft by a set-screw, $f$, as shown in the drawings. The rock-shaft G is arranged exactly in the middle of the width of the frame A, and receives a rapid oscillating motion from crank-shaft E as the machine is moved along. Upon the lower ends of the shanks $e\ e$ knives $g\ g$ are formed, with their cutting-edges arranged in opposite directions, as shown in fig. 3, so as to cut or chop out the plants in moving both ways. The knives may be made of any suitable length, and they may have their edges parallel to each other, or slightly oblique, so as to chop with a draw cut. By loosening the set-screw $f$, the knives can be set up or down, and made to chop or thin out the plants with considerable precision. In front of said vibrating knives, and arranged at equal distances on both sides of the centre of the machine, are two scraping-shares or plates, H H, which are secured to standards I I, that are firmly bolted to the front cross-beam of frame A. These plates incline backward, and are arranged so as to throw the grass and weeds from the plants. Their front and bottom edges are sharpened, and their front edges bent forward, as shown in the drawings. In rear of the vibrating knives, and secured to the intermediate cross-beam of frame A, are two shovels or ploughs, J J, the object of which is to loosen the earth on both sides of the rows of plants, and throw the earth lightly about the roots of the plants which are left standing.

The machine is drawn by two horses walking between the rows, and guided by a person who walks behind, and has hold of the two handles L L.

The movement of the knives or hoes $g\ g$ is so timed, with relation to the forward movement of the machine, that a space of about three inches is left untouched by these knives between every stroke, thus thinning out the plants, and leaving the proper number required in a row at regular intervals apart.

Having described our invention, what we claim as new, and desire to secure by Letters Patent, is—

1. The arrangement of vibrating knives or hoes $g\ g$, between the scrapers H H and the siding-ploughs J J, in a two-wheel machine, substantially as and for the purposes described.

2. The right and left-hand knives $g\ g$, formed on or applied to shanks $e\ e$, secured together, and applied to a rock-shaft, G, substantially as described.

E. H. GOELET,
E. B. GOELET.

Witnesses:
E. R. COX,
B. B. BAIFORD.